United States Patent [19]
Sato et al.

[11] Patent Number: 6,072,701
[45] Date of Patent: Jun. 6, 2000

[54] CURRENT RESONANCE TYPE SWITCHING POWER SOURCE

[75] Inventors: Nobuo Sato; Yuji Sekikawa; Noritoshi Imamura, all of Miyagi, Japan

[73] Assignee: Sony Corporation, Tokyo, Japan

[21] Appl. No.: 09/288,633

[22] Filed: Apr. 9, 1999

[30] Foreign Application Priority Data

Apr. 16, 1998 [JP] Japan .................................. 10-106124

[51] Int. Cl.$^7$ ................................................. H02M 3/335
[52] U.S. Cl. ................................................. 363/17; 363/16
[58] Field of Search ................................. 363/16, 17, 95, 363/97, 131, 132

[56] References Cited

U.S. PATENT DOCUMENTS 5,481,449  1/1996  Kheraluwala et al. .................... 363/17
5,986,895  11/1999  Stewart et al. ............................ 363/16
5,991,167  11/1999  Van Lerberghe .......................... 363/16

*Primary Examiner*—Matthew Nguyen
*Attorney, Agent, or Firm*—Ronald P. Kananen; Rader, Fishman & Grauer

[57] ABSTRACT

In a switching power source, by alternately turning on the first and second MOS transistors, a resonance current flows to a primary winding of a transformer, and an alternate current is transmitted to a secondary side. With respect to an alternate signal generated in a secondary winding, a gate voltage is applied so that the third MOS transistor and the fourth MOS transistor are conductive, respectively, while the polarity of the alternate signal is positive. Rectifying currents are flowed to a capacitor and a full-wave rectification is executed. Since a control signal for synchronous control is supplied from a signal source to control the first and second switching elements via transformers, a switching timing can be accurately coincided with an on/off timing of a synchronous rectifying device by a simple circuit. The efficiency of a current resonance type switching power source is thus improved.

4 Claims, 4 Drawing Sheets

CURRENT RESONANCE TYPE SWITCHING POWER SOURCE

BACKGROUND OF THE INVENTION

1. Field of the Invention

The present invention relates to a switching power source circuit and more particularly to a switching power source which is useful when an output voltage to be obtained on a secondary side in a current resonance type switching power source is used as a synchronous rectifying method.

2. Description of Related Art

Recently, in association with saving energy in the global environment, various switching power sources have been requiring higher efficiency with noise reduction.

Particularly, as for a power source circuit for such as a computer, communication equipment and the like, a dc—dc converter where high efficiency is maintained and noises are small even when a low voltage output, has been requested.

However, generally, if a low voltage is outputted, in case of having the same consumption power, an output current becomes a large current. In case of the dc—dc converter, a resistance loss due to a rectifying diode on a secondary side indicates a large power loss.

Therefore, it is considered that by using a current resonance type switching power source where noises are relatively small with high efficiency, and a rectifying device to output by a low on-resistor on the secondary side, for instance, an MOS transistor, a DC output voltage is derived by rectifying by a synchronous rectifying method.

FIG. 4 shows an example of a switching power source circuit using such a combination. Reference symbols Q1 and Q2 denote switching elements which comprise MOSFET, serially connected, respectively. A reference symbol T denotes an isolation transformer for transferring a switching power on a primary side to a secondary side.

IC denotes a signal source for alternately turn on/off the switching elements Q1 and Q2 at a predetermined switching period and, regularly, is constructed so as to enable a switching frequency of the switching elements to be varied while comparing an output voltage V0 with a reference voltage by voltage detecting means (not shown) for controlling so that the output voltage V0 can be set to a constant voltage.

The output of the switching elements Q1 and Q2 is supplied to a primary winding L1 of the isolation transformer T and a resonance capacitor C1. If the switching elements Q1 and Q2 are alternately turned on/off, the primary winding L1 of the transformer is driven by a current to charge/discharge the resonance capacitor C1 to resonate to a leakage inductance of the transformer T. As shown in FIG. 5, a voltage V1 which is applied to the primary winding L1 is induced as V2 to a secondary winding L2. In case of the normal dc—dc converter, by a pair of diodes for rectifying, a full wave rectification is performed.

However, if the output voltage is low, loss by the rectifying diodes is remarkably large. As shown in FIG. 4, thus, in place of the rectifying diode, by using N-channel MOS transistors Q3 and Q4, a full wave rectification is performed by a synchronizing method. A circuit where the DC voltage V0 is outputted from a smoothing capacitor C0 is constructed.

In case of the circuit in FIG. 4, the smoothing capacitor C0 is charged with a full wave rectifying voltage via the MOS transistors Q3 and Q4 under low resistance.

"D" shows a parasitic diode which is made up by the MOS transistors Q3 and MOS transistors Q4.

At the time of turn-on, a current resonance type switching power source in which the switching elements are half-bridge-connected is set so as to execute a zero current switching. Since the power source is set to resonate to a current at the turn-off time, the power source is characterized in that the noises are essentially small and the output voltage V0 on the secondary side can be widely varied by changing the switching frequency. However, in order to assure a wide regulating range, in the whole period, there is also a case where the power source has a rectifying current continuous mode for transmitting a current to the secondary side, and a secondary side rectifying discontinuous mode for which a current is not supplied on the secondary side.

However, conventionally, the output voltage or the current of the isolation transformer T is detected and a logic circuit to control the MOS transistors Q3 and Q4 is built in. For example, control circuits are provided so that voltages at "a" point and "b" point in an output circuit in FIG. 4 are detected, a proper on/off control signal is generated, and the MOS transistors Q3 and Q4 are conducted.

If such a circuit is, however, provided, the following problems are caused. The number of parts is increased. As shown in FIG. 5, when the rectifying device is turned on/off while detecting the voltage V2 at the output point, a time point C to actually detect the voltage is delayed from the generation time point of the output voltage V2 of the isolation transformer. Since the rectifying device enters in a conductive state from the time point C and a current Id flows, a rectifying current id is delay controlled and the efficiency of the rectifying operation is low.

The control voltage detection delay causes the timing at which both rectifying device Q3 and Q4 are turned off, resulting in the problem where conduction angle of rectifying current is narrower, against which electric power transferring rate should be lowered by lowering the power factor.

SUMMARY OF THE INVENTION

A current resonance type switching power source according to the invention is provided in order to solve the problem.

A current resonance type switching power source, having a driving circuit for alternately turning on/off switching elements which are half-bridge-connected to a DC voltage, in which an alternate voltage is applied from a node of the switching elements to a primary side of an isolation transformer via a resonance capacitor, and enabling a predetermined alternate voltage to be obtained from a secondary winding of the isolation transformer. The switching power source is constructed such that a pair of rectifying devices which are controlled at a timing so as to be alternately turned on are provided on an output side of the secondary winding, and an on/off control signal of the pair of rectifying devices is supplied from a signal source to turn on/off the switching elements.

Since a turn on/off control for the rectifying devices is executed interlockingly to an on/off control for the switching elements, for example, at a timing to turn on one switching element, one rectifying device is necessarily turned on and the on-timing of the switching output voltage and the rectifying device can be perfectly corresponded.

Such a control voltage is easily outputted from the signal source which drives the switching elements, so that the circuit can be downsized without increasing the number of parts.

DETAILED DESCRIPTION OF THE PREFERRED EMBODIMENTS

Figure 1:
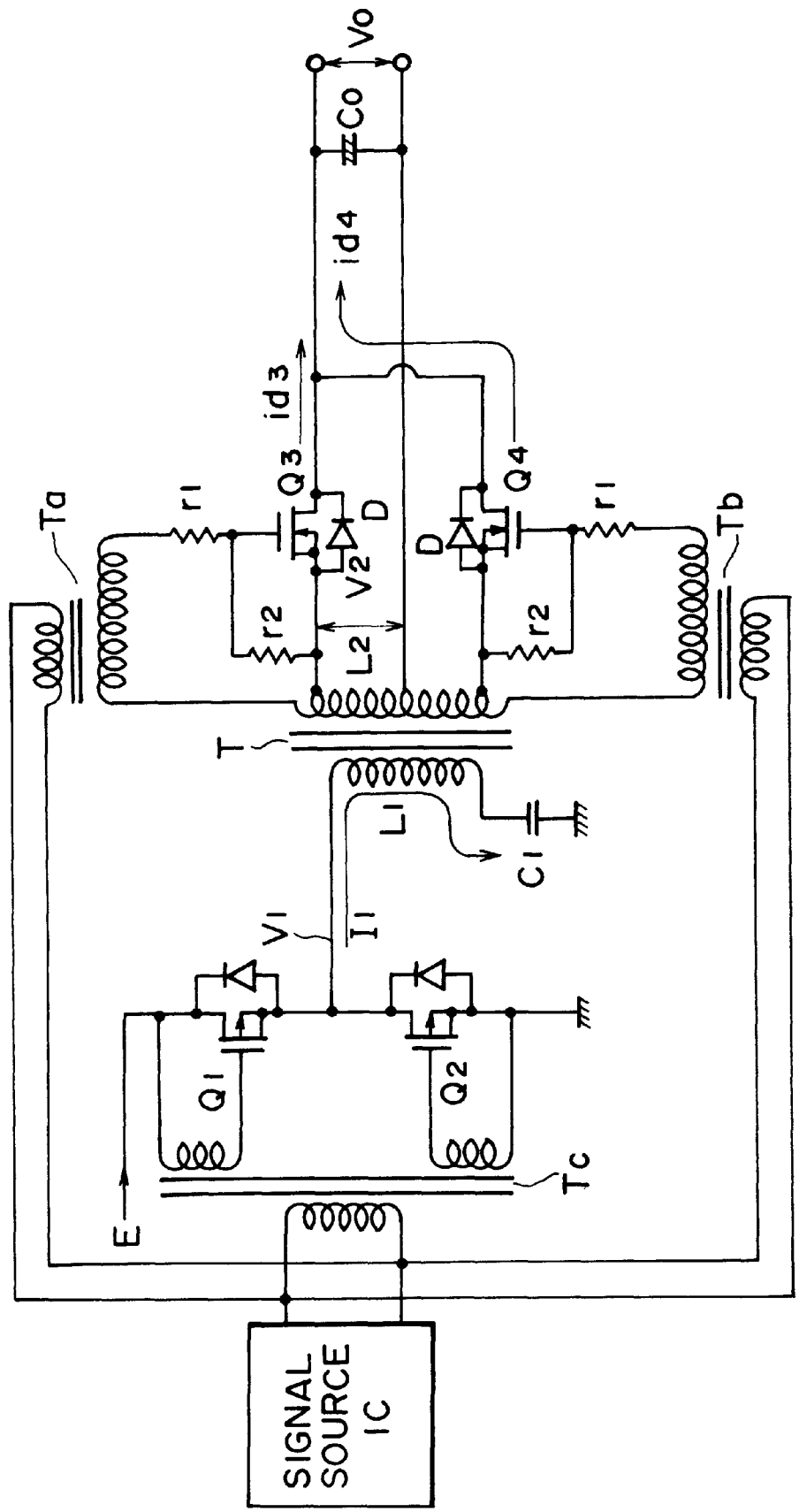
FIG. 1 is a circuit diagram for showing an embodiment of a power source circuit for a current resonance type switching power source of the invention.
Figure 4:
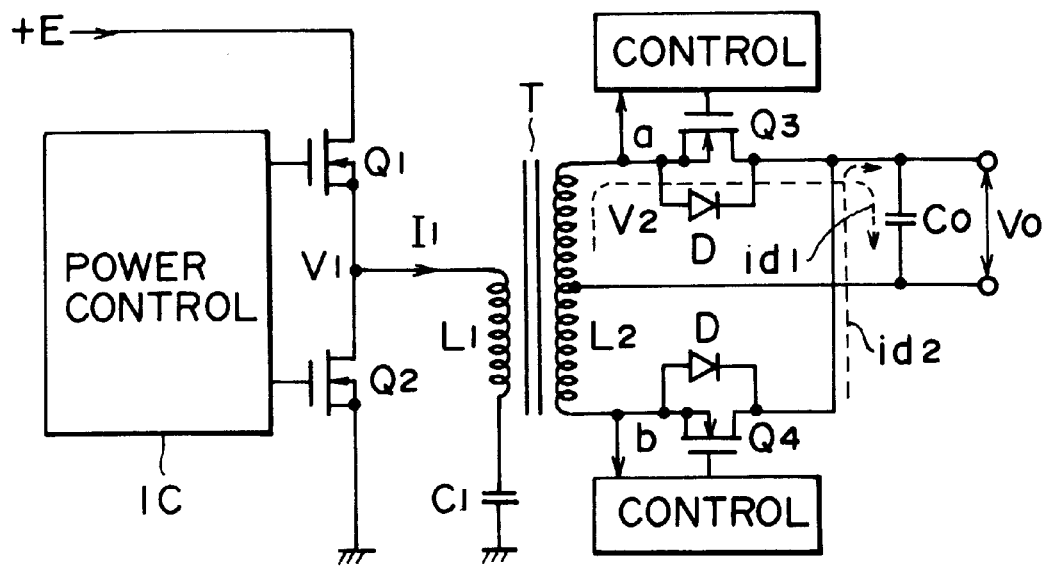
FIG. 4 is an explanatory circuit diagram when a synchronous rectifying method is used for a current resonance type switching power source.

FIG. 1 shows a current resonance type switching power source circuit of an embodiment according to the invention. As shown in FIG. 4, a reference symbol E denotes a supply power source and Q1 and Q2 denote switching elements forming a switching circuit of the half bridge connection. Those elements are constructed by MOSFET transistors.

The output is connected to a connecting terminal of the supply power source E through the primary winding L1 of the isolation transformer T and the resonance capacitor C1.

In order to charge the smoothing capacitor C0 with an induction voltage induced by the secondary winding L2 of the isolation transformer T via the MOS transistors Q3 and Q4 of the synchronous rectifying type, a full wave rectifying circuit is constructed.

In the case of the switching power source, the on/off control signal to drive the MOS transistors Q3 and Q4 is constructed so as to be supplied to gates of the MOS transistors Q3 and Q4 comprising the rectifying devices, respectively, from the signal source to drive the switching elements Q1 and Q2 via driving transformers Ta and Tb.

In correspondence with a polarity of the output voltage of the secondary winding, for instance, the rectifying device whose output voltage of the secondary winding is positive is turned on.

An operation of the switching power source will be simply described hereinbelow. When the supply power source E is applied, for example; the MOS transistors are driven so that the MOS transistor Q1 is turned on and the MOS transistor Q2 is turned off. At this time, the resonance capacitor C1 is charged from the supply power source E through the MOS transistor Q1 and the primary winding L1 of the transformer.

Subsequently, in correspondence with a resonance period on the primary side, the MOS transistors are driven so that the MOS transistor Q1 is turned off and the MOS transistor Q2 is turned on. Thus, a resonance current of the resonance capacitor C1 is flowed to the primary winding L1 of the transformer T and an alternate power is transferred to the secondary side.

With respect to the alternate voltage which is generated in the secondary winding L2, coincidentally with the on/off timing of the switching elements Q1 and Q2, for example, the gate voltage is applied such that the MOS transistors Q3 and Q4 are conductive, respectively, for a period of time when its polarity is positive. Rectifying currents id3 and id4 are flowed to the capacitor C0, thereby executing a full wave rectifying.

Figure 5:
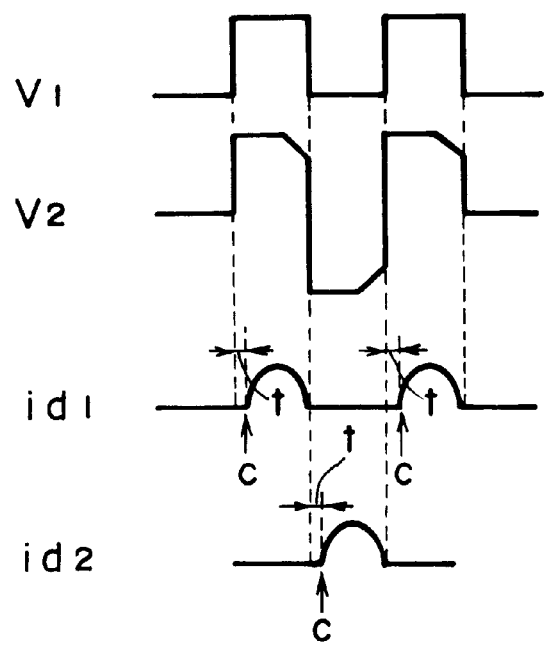
FIG. 5 is an explanatory waveform diagram of a control voltage occurring during the synchronous rectification.

In the embodiment of the invention, as mentioned above, the polarity of the output of the isolation transformer T is changed coincidentally with the on/off timing of the switching elements Q1 and Q2. Therefore, as shown in FIG. 5, a phase delay (t) between the output voltage and the current which flows in the rectifying device is not caused. The conduction angle of the rectifying current is widened, so that a DC voltage can be efficiently applied.

Since the conduction angle is not narrow, power factor is kept to be small. The efficiency of the switching power source is also increased while the noises is effectively suppressed.

"IC" is an IC circuit for control over driving the switching elements Q1 and Q2. The IC circuit normally controls the switching frequency so as to maintain the output voltage V0 to a constant voltage and detects an irregular increase in temperature of the switching power source, so that it can have a protecting function for stopping a switching operation.

Resistors r1 and r2 have a function for setting an on-timing by a proper time-constant for a gate capacity.

According to the invention, the on/off control of the rectifying devices is executed synchronously with the on/off control of the switching elements, so that a flow start of the rectifying current and a leading point of the output voltage can be perfectly coincided with each other. This can improve the efficiency of the rectifying output.

When the switching period of the switching elements Q1 and Q2 is changed, the synchronous rectification is executed while tracing without a phase delay for the change. Therefore, the regulation of the voltage is improved. Since a driving pulse of the signal source for switching is used, the switching power source of the synchronous rectification type can be constructed by a small number of parts.

The rectifying device is not limited to a MOS transistor. As far as a rectifying device is an active element able to realize another resistor, the element can be used.

Figure 2:
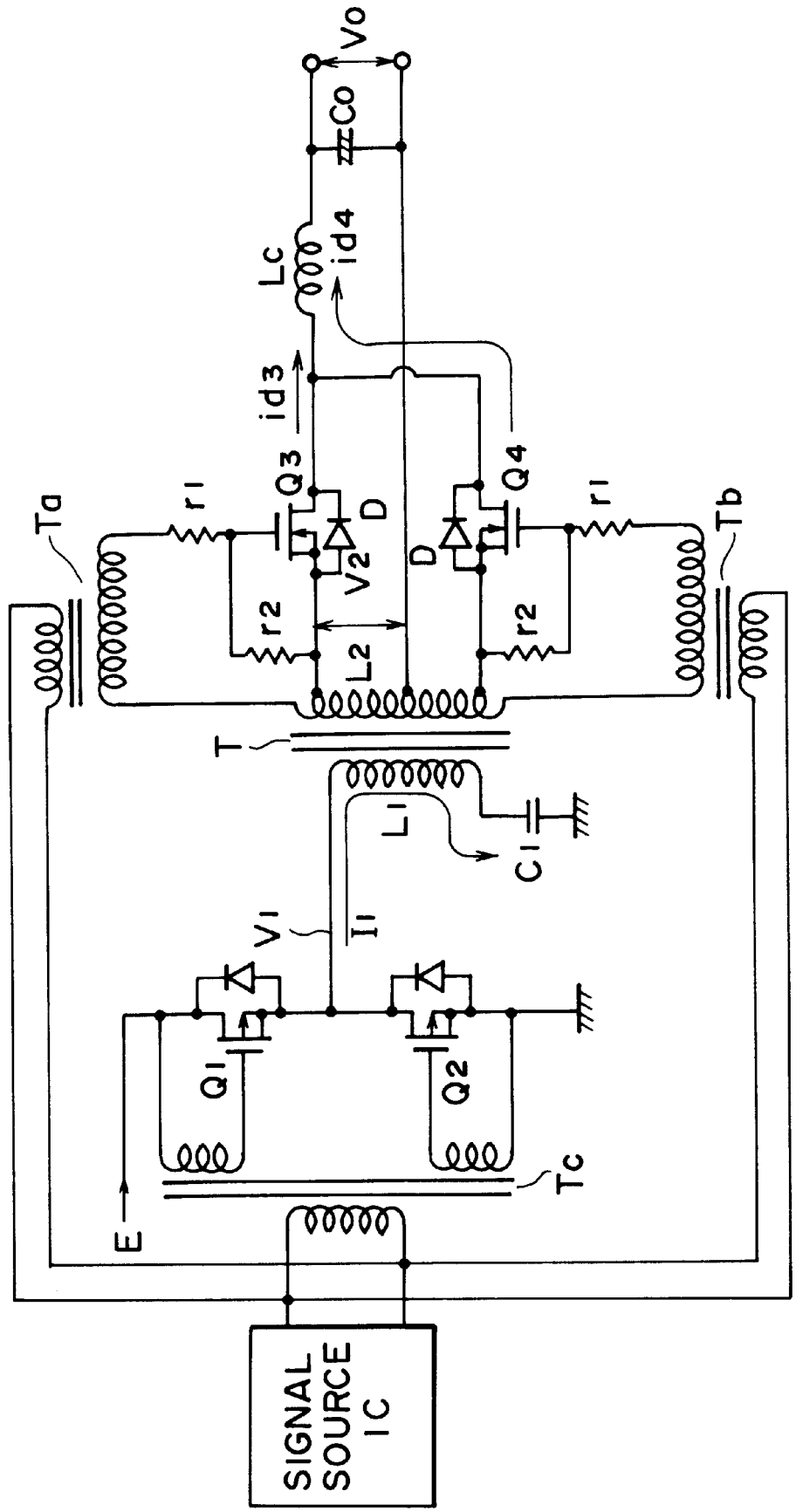
FIG. 2 is a circuit diagram for showing the embodiment in case of choke input method in FIG. 1.

As shown in the embodiment in FIG. 2, as for a rectifying current, under the choke input method of charging the smoothing capacitor with a rectifying current via an inductor Lc, a current flowing in the reverse direction upon switching, apt to be generated when a switching element of an analog type is used as a rectifying device, can be eliminated.

That is, when the mode is a discontinuous rectification mode and the reverse direction current which is occurred in case where the voltage of the smoothing capacitor is higher than output voltage V2 is stopped by the counter-electromotive force of the inductor. This can decrease the heat upon switching.

Figure 3:
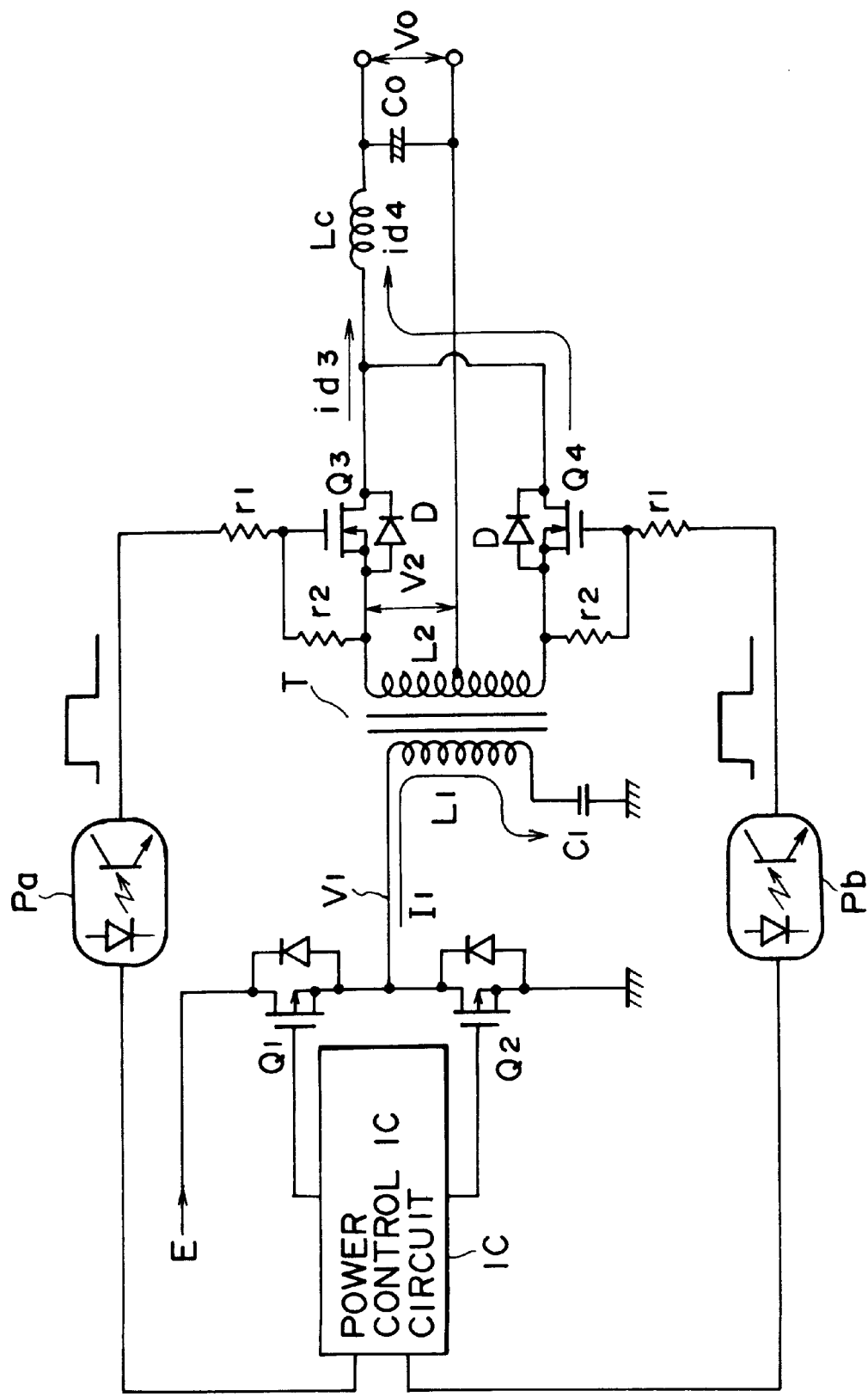
FIG. 3 is a circuit diagram showing another embodiment of the invention.

FIG. 3 shows another embodiment of the invention. By the on/off control signal of the rectifying device, a driving pulse from the signal source (IC) is supplied to a gate electrode of the rectifying device via photoelectric converting elements Pa and Pb comprising a photodiode, a photo detecting transistor and the like and a proper voltage amplifier (not shown).

In this case, the control signal to drive the rectifying device can be supplied in a state where the primary side is insulated from the secondary side without transmitting via the transformer.

As has been mentioned, in a current resonance type switching power source according to the invention, particularly, when a rectifying device of a synchronous rectification type is adapted to a current resonance type switching power source of a half bridge type, a drive signal of the switching power source is supplied to the synchronous rectifying device. Therefore, a rectifying operation can efficiently be executed in no need of a specific circuit.

Particularly, an undelayed rectifying control voltage for switching permits a circulation angle of the rectification voltage to be large for improving a power factor of the switching power source.

What is claimed is:

1. A current resonance type switching power source having a driving circuit for alternately turning on/off switching elements which are half-bridge-connected to a DC voltage, in which an alternate voltage is applied from a node of said switching elements to a primary side of an isolation transformer via a resonance capacitor, thereby enabling a predetermined alternate voltage to be obtained from a secondary winding of said isolation transformer, wherein a pair of rectifying devices which are controlled at a timing so as to be alternately turned on are provided on an output side of said secondary winding, and an on/off control signal of said pair of rectifying devices is supplied from a signal source to turn on/off said switching elements.

2. A current resonance type switching power source according to claim 1, wherein said switching elements and said rectifying devices comprise transistors.

3. A current resonance type switching power source according to claim 1, wherein said on/off control signal is supplied by a transformer coupling from said signal source.

4. A current resonance type switching power source according to claim 1 or 2, wherein a smoothing capacitor is charged with a rectifying current via a choke coil to conduct said rectifying devices.

* * * * *